United States Patent [19]

Thomas

[11] E Re. 29,855

[45] Reissued Dec. 5, 1978

[54] FASTENER POSITIONING DEVICE

[76] Inventor: Edward L. Thomas, 103 Chapman Rd., Greenville, S.C. 29603

[21] Appl. No.: 850,245

[22] Filed: Nov. 9, 1977

Related U.S. Patent Documents

Reissue of:

[64] Patent No.: 4,015,746
Issued: Apr. 5, 1977
Appl. No.: 652,298
Filed: Jan. 26, 1976

[51] Int. Cl.[2] ..... B65H 3/36

[52] U.S. Cl. ..... 221/263

[58] Field of Search ..... 227/116, 115, 119, 110, 227/113; 221/263

[56] References Cited

U.S. PATENT DOCUMENTS

| | | | |
|---|---|---|---|
| 1,145,774 | 7/1915 | Kotkovsky | 221/263 X |
| 2,155,568 | 4/1939 | Standish et al. | 221/263 X |
| 2,783,468 | 3/1957 | Schwartz | 227/116 |
| 2,982,965 | 5/1961 | Willhauck | 221/263 X |
| 3,666,155 | 5/1972 | Saluzzi | 227/116 X |

*Primary Examiner*—Stanley H. Tollberg
*Attorney, Agent, or Firm*—Bailey, Dority & Flint

[57] ABSTRACT

A fastener positioning device is illustrated wherein an elongated member is slidably carried within a housing, the elongated member having a notch at the forward end thereof opening at the front end and on one side of the elongated member for receiving an enlarged fastener with the shank depending through the notch, and a retaining leaf spring engaging the enlarged head of the fastener. Means are provided for moving the elongated member forwardly while the retaining means supports and maintains the fastener within the notch during forward movement of the elongated member, but freeing the fastener when the elongated member is in forward position to permit retraction of the elongated member.

2 Claims, 7 Drawing Figures

FASTENER POSITIONING DEVICE

Matter enclosed in heavy brackets [ ] appears in the original patent but forms no part of this reissue specification; matter printed in italics indicates the additions made by reissue.

BACKGROUND OF THE INVENTION

Fastener positioning devices in a wide variety of constructions have been provided heretofore. Such devices are usually stationary although portable devices of sorts have been utilized. Many of the positioning devices of the prior art have utilized impact means having a magnitized head for receiving and positioning the head of fasteners fed from various fastener feeding devices. Problems have arisen in connection with such devices in that there have been no reliable means for insuring that the fasteners will be received from the feeding device every time in a desired position by the magnitized impact head. Such reception of the fastener would be complicated were the positioning device mobilized to move from one position to another. A recent effort to provide effective means for aligning the fastener is exemplified by the disclosure of U.S. Pat. No. 3,765,588 which utilizes magnitized means for aligning the shank of the fastener means. The entire arrnagement is movable laterally in response to movement of the impact means. The fastening means which may be utilized therewith are limited, since a particular shank construction is required. Moreover, since the fastening means are not positively positioned, such would be of questionable value if utilized with a mobile structure where positive positioning is necessitated due to vibration encountered when moving the entire apparatus from place to place while discharging and impacting fasteners.

Accordingly, it is an important object of this invention to provide a fastener feeding and positioning means capable of use with a vehicle which may be moved to position the fasteners in a desired sequence and position on an extensive nailable area such as a roof deck and the like. Devices constructed in accordance with the present invention have particular utility in connection with the fastening down of felts, sheet metal, and paper, etc., utilized in vermiculite, metal and wood, etc. deck constructions.

Another important object of the invention is to provide positive means for positioning fasteners which maintain the positioning of the fastening means positively at all times until they are positioned by a magnetized impact head immediately prior to impact.

Another important object of the invention is to provide a positive fastening positioner which will work every time to position fasteners and which will require a minimum of attention while in operation and a minimum of maintenance thereafter.

BRIEF SUMMARY OF THE INVENTION

It has been found that a reliable fastener positioning means may be provided by utilizing an elongated slidable member having an open ended notch carried by the forward end of the slidable member for receiving a fastener having an enlarged impact receiving head with the shank depending through the notch together with a retaining means which engages the fastener while in the notch and which maintains engagement with the head of the fastener during the advancing movement of the elongated member to position the impact receiving fastener head for reception by a magnetized impact imparting head. The elongated member is then withdrawn, the retaining means being so as not to interfere with the shank while the positioning means is withdrawn so as not to interfere with the action of the impact head while driving the fastener into position with the shank passing into the nailable structure which is to be fastened by the fastening device.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereto, wherein an example of the invention is shown and wherein.

DESCRIPTION OF A PREFERRED EMBODIMENT

Figure 1:
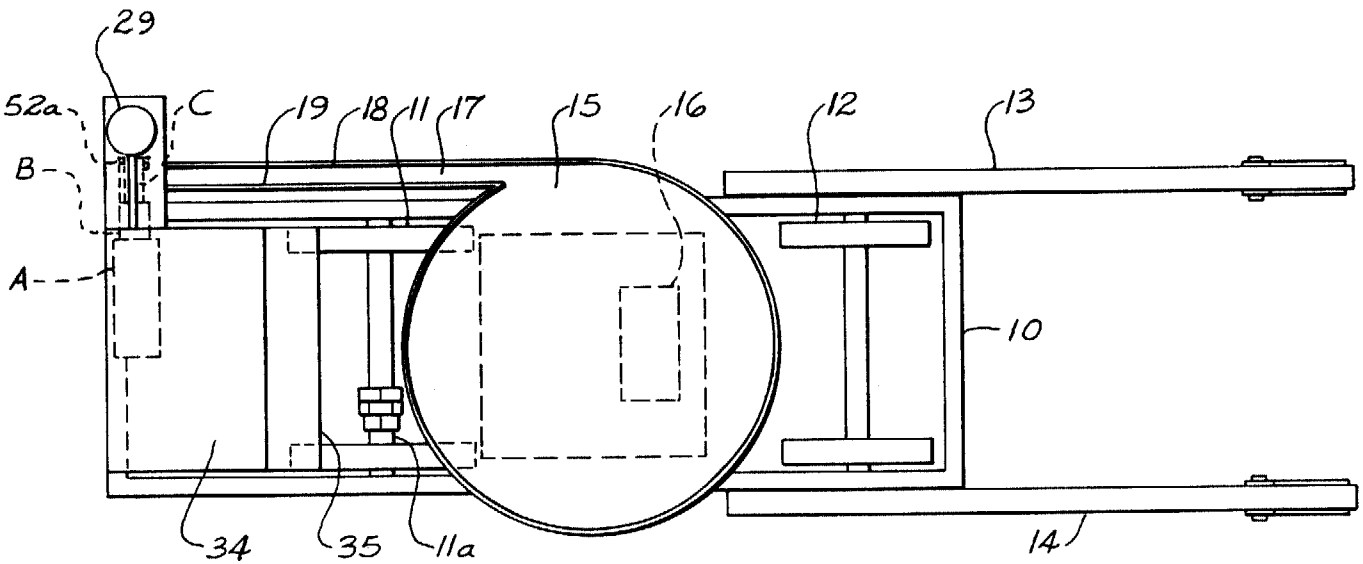
FIG. 1 is a top plan view, illustrating the fastener positioning device constructed in accordance with the present invention utilizing a wheeled vehicle with parts schematically illustrated and with parts omitted for purposes of clarity.

The drawing illustrates a device for positioning fasteners, said fasteners having an enlarged impact receiving head and an elongated shank portion extending outwardly from an intermediate position thereof, including a housing A. An elongated member B is slidably carried by the housing. A notch C carried at one end of the elongated member is open at an end and side of the elongated member for receiving a fastener supporting the head with shank projecting through the notch. A retaining means D, in the form of a leaf spring, is carried by the housing on one side of the head remote from the shank. The leaf spring has a bearing member E positioned forwardly of the notch supporting the head in the notch. Means F are provided for moving the elongated member forwardly while the fastener is retained in the notch by the force of the spring for positioning the fastener prior to rearward movement of the elongated member.

Referring more particularly to FIG. 1, a wheeled vehicle is illustrated having a support plaform 10 carried by a pair of forward wheels 11 and a pair of rearward wheels 12. The plaform 10 carries a pair of rearwardly and upwardly projecting handles 13 and 14. A feeding device is positioned on the platform 10 between the wheels and includes a feed bowl 15 having suitable vibrating means schematically illustrated at 16 for feeding fasteners into an open track 17 defined between spaced guide rail means 18 and 19. The enlarged head portions of the fastening means ride on the rails 18 and 19 with the enlongated shank portions thereof depending through the open track 17 as will be described in greater detail below.

Figure 2:
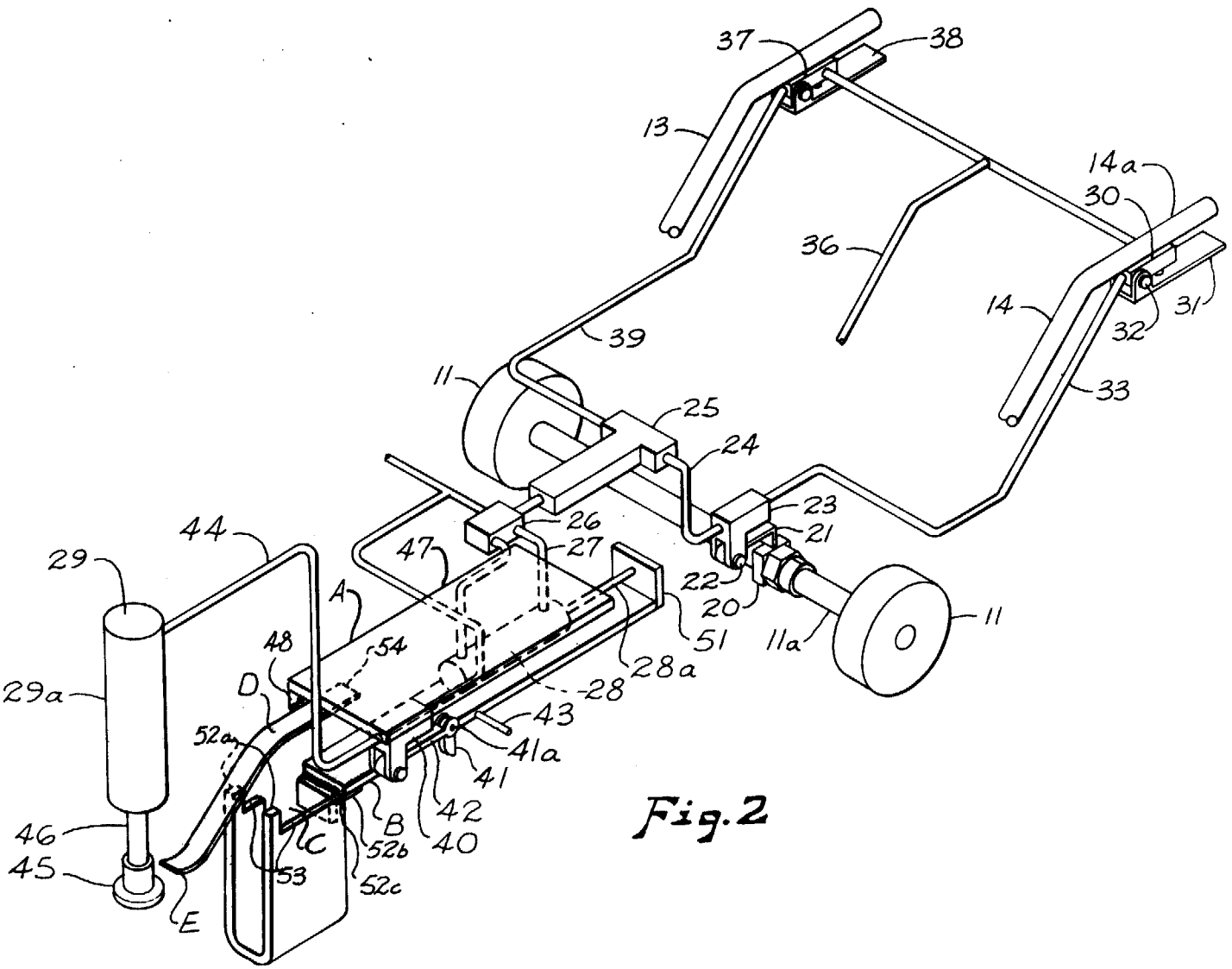
FIG. 2 is a schematic perspective view illustrating various control mechanisms for operating various parts of the device illustrated in FIG. 1.

It will be observed that an axle 11a which carries the forward pair of wheels 11 (FIG. 2) carries a variety of cams 20. These cams are utilized to actuate a fluid operated mechanism controlling the feeding and impacting of the fasteners utilized with the device. The cam means 20 is illustrated as depressing a lever 21 which is pivoted as at 22 on the valve 23 for actuating a pneumatic valve 23 causing air to flow through the line 24 and the fittings 25 and 26 to the line 27. This actuates the piston of the cylinder 28 to advance the positioning mechanism moving a single fastener forwardly to be received by the magnitized impact head of the impactor 29 as will be explained in greater detail below.

For automatic operation, a valve 30 is carried adjacent the gripping portion 14a of the handle 14 so that a leve 31 pivoted as at 32 may be manually depressed causing air from a suitable supply to be fed through the line 33 to the valve 23. An engine 34 drives a compressor 35 carried by the platform 10 which supplies air through the line 36 to the valve 30. For manual operation, a valve 37 may be hand operated through the lever 38 to selectively supply air through the line 39 to the fittings 25 and 26 for operating the cylinder 28 as desired.

The elongated member B of the fastener positioning device is withdrawn preparatory to impact by the impactor 29. The valve 40 is actuated by engagement of a depending link 41 carried by the lever 42 which is engaged by an outwardly projecting stop 43 carried by the elongated member B for actuating the valve 40 to supply air through the line 44 to the cylinder 29a of the impactor and to move the elongated member B toward the right hand side in FIG. 2. The impactor head 45 is magnitized and is carried by a rod 46 carried by a piston (not shown) within the cylinder 29a.

Figure 3:
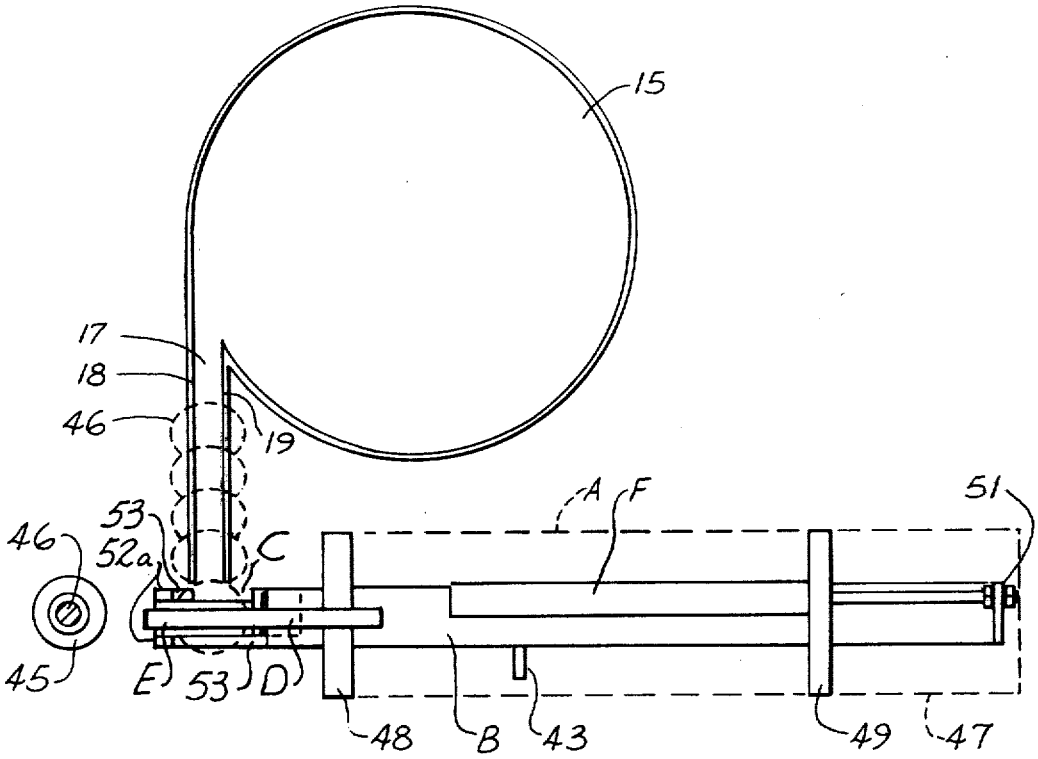
FIG. 3 is a schematic plan view illustrating the fastener positioning device with parts in position for receiving a fastener from a suitable feeding device positioned laterally of a fastener receiving notch.
Figure 4:
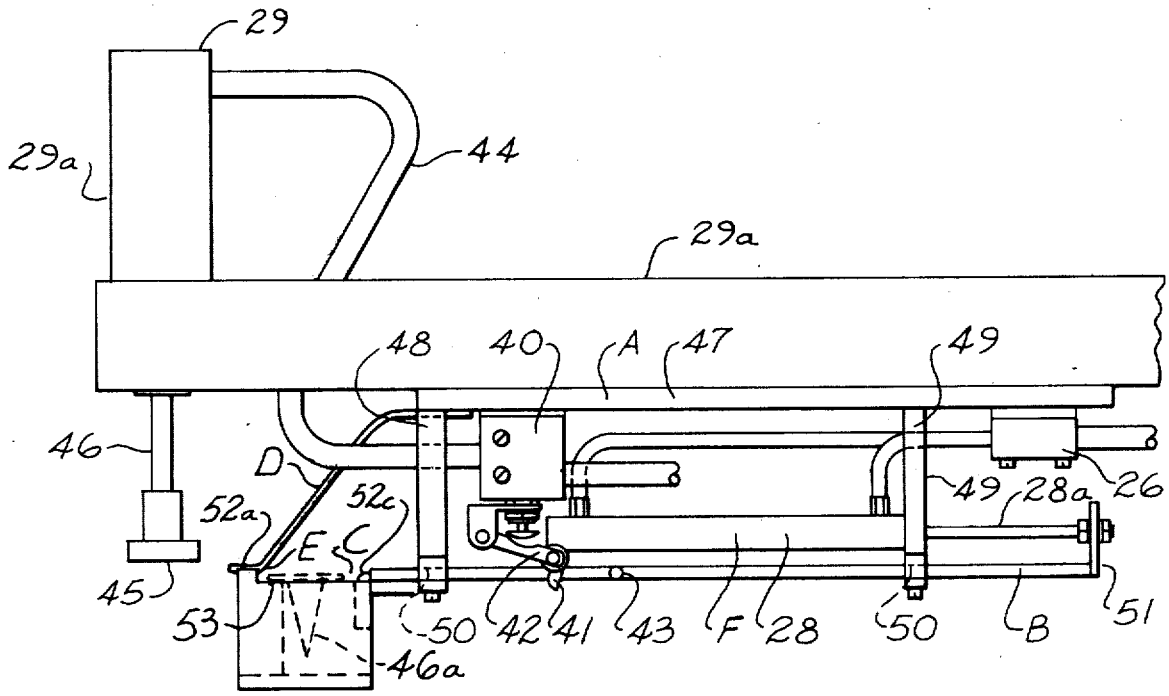
FIG. 4 is a side elevation illustrating the fastener positioning device with the parts in position illustrated in FIG. 3.

Referring more particularly to FIGS. 3 and 4, the fasteners are illustrated in broken lines as having an enlarged impact receiving head 46 and a shank portion 46a which extends into the open trackway 17 between the guide rails 18 and 19 which support the enlarged head 46 for feeding the fasteners to the positioning device hereof.

The housing A is illustrated as including an elongated upper plate 47, supporting end frame members 48 and 49 each of which has a slot 50 in the lower portion thereof for permitting longitudinal sliding movement of the elongated slide member B. The slide member B had connected on one end a piston rod 28a projecting from the piston of the cylinder 28 as by the bracket member 51.

It will be observed that the notch C is defined by a U-shaped member 52 whose vertical legs present a free upper surface 53 and by a pair of spaced vertical stops carried forwardly thereof so that the slot opens forwardly and provides sufficient depth to accommodate the shank of the fastener. The U-shaped member 52 is fastened to the elongated member B and by a bracket 52b welded to both members as at 52c. One of the legs opens laterally as at 52a.

The leaf spring D has connection as at 54 between the plate 47 and the end frame member 48. The elongated sliding member B carries the fastener 46 forwardly to the position shown in FIG. 5 with the fastener retained by the force of the spring D in position to be received by the magnetic head 45 of the impact member 29.

It will be observed that the leaf spring D extends substantially horizontally and rearwardly to support the adjacent upper portion of the head 46 of the fastener so that the shank portion 46a depends within the slot C.

Figure 5:
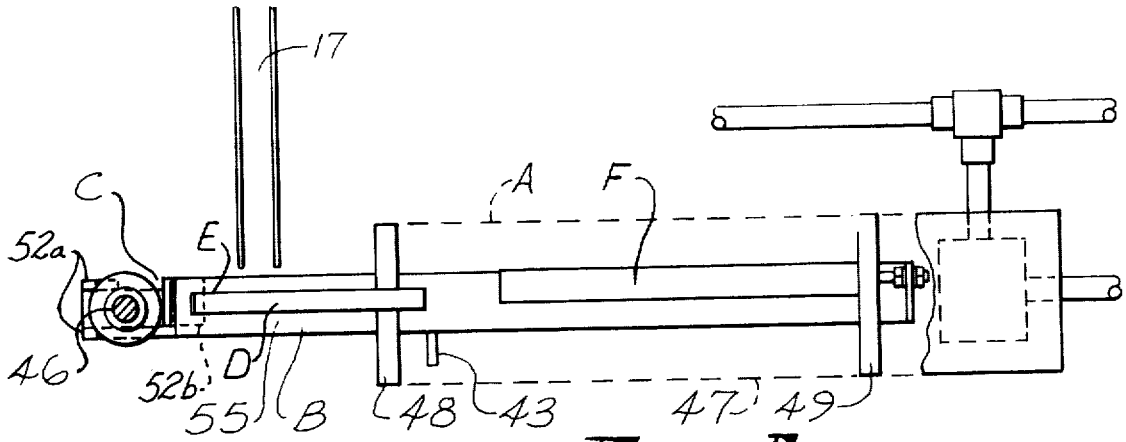
FIG. 5 is a top plan view illustrating the fastener positioning device with parts moved to a forward position having carried the fastener to a position where it is received by the magnetized impact head.
Figure 6:
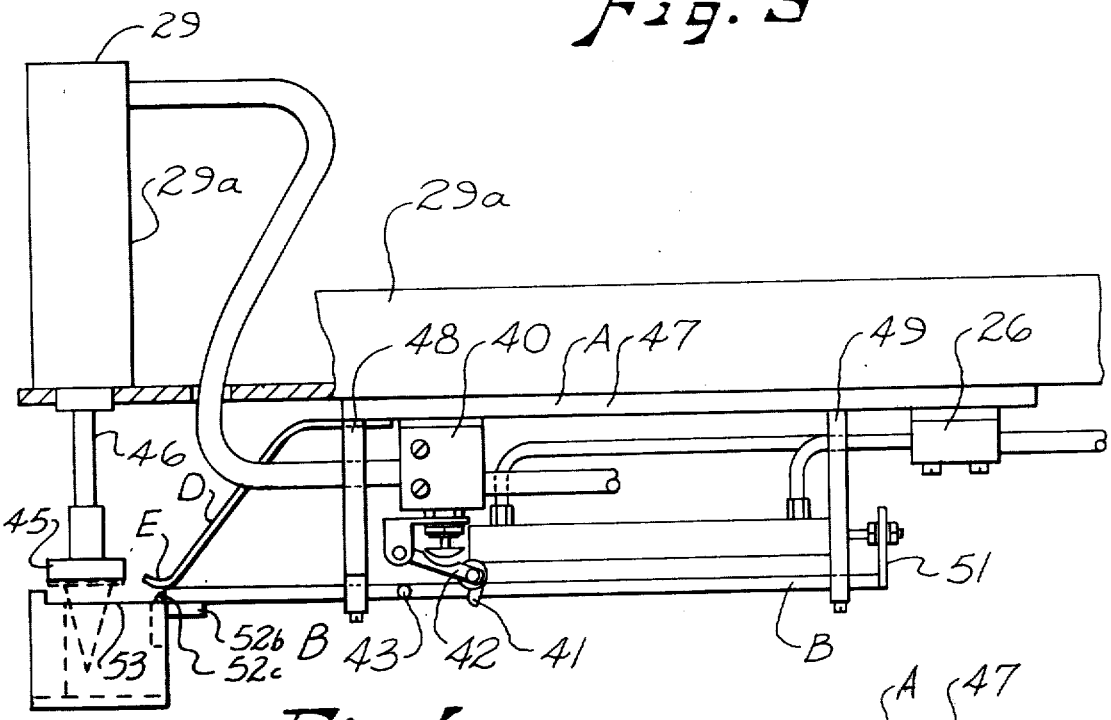
FIG. 6 is a side elevation illustrating the device with parts positioned as in FIG. 5.
Figure 7:
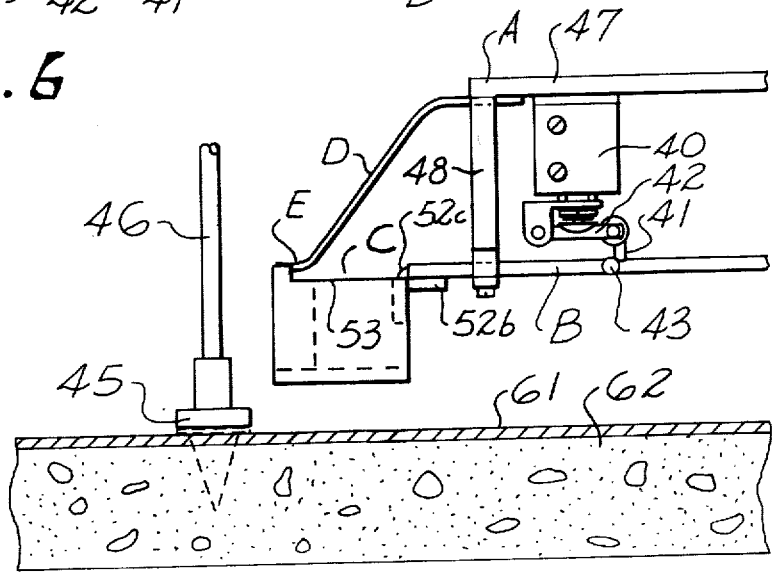
FIG. 7 is a side elevation illustrating the parts of the fastener positioning device in withdrawn position immediately following impact.

The slide B is moved forwardly by actuation of the means F including the cylinder 28 and rod 28a. When in forward position as illustrated in FIG. 5, the enlarged head 46, is freed of encumbrance by the spring D and is in a position to be received by the magnetic head 45 permitting the elongated slide member B to be freely withdrawn to a position as illustrated in FIG. 7. When the slide member B is withdrawn to a sufficient extent as illustrated in FIGS. 6 and 7, the depending link 41 moves about its pivot 41a moving the lever 42 upwardly to actuate the valve 40 which permits air to flow to the cylinder 29 through the line 44 producing impact causing the shank to pass into the nail receiving portion such as for fastening felt, sheet metal, paper, etc. 61 to a vermiculite, metal, wood, etc. deck 62.

It will be observed that the fastener feeding means including the track defined by the rails 18 and 19 feed a supply of fasteners by gravity for reception one at a time at the open side of the notch C. This supply of fasteners is interrupted by the elongated member B upon forward movement thereof so that the notch is no longer in registry with the supply moving down the track, thus, temporarily cutting off the supply until the notch is in position to receive another fastener during another succeeding operation of the apparatus.

While a preferred embodiment of the invention has been described using specific terms, such description is for illustrative purposes only, and it is to be understood that changes and variations may be made without departing from the spirit or scope of the following claims.

What is claimed is:

[1. A device for feeding fasteners having an enlarged impact receiving head and an elongated shank portion extending outwardly from an intermediate position thereof to a fastener receiving means comprising:

a housing;

an elongated member slidably carried by said housing;

a notch at one end of said elongated member open at an end and side of said elongated member receiving a fastener supporting the head with the shank projecting through the notch;

retaining means carried by said housing engaging said head remote from the shank maintaining said fastener within said notch;

means moving said elongated member forwardly while said retaining means engages said head maintaining said fastener within said notch for positioning the fasteners for reception by the fasteners receiving means prior to retracting the elongated member permitted by said notch open at an end releasing said shank portion formerly disposed therein.]

[2. The structure set forth in claim 1, wherein said retaining means is a leaf spring resiliently engaging said head as said elongated member is moved forwardly sliding said head against the leaf spring.]

[3. The structure set forth in claim 1 including, fastener feeding means feeding a supply of fasteners by gravity for reception at said side of said notch, said supply of fasteners being interrupted by said elongated member upon forward movement thereof so that said notch is no longer in register with said supply.]

[4. The structure set forth in claim 3 wherein said notch is of sufficient size to accommodate a single fasteners.]

[5. A device for feeding fasteners having an enlarged impact receiving head and an elongated shank portion extending outwardly from an intermediate position thereof to a fastener receiving means comprising:

a housing;

an elongated member slidably carried by said housing;

a notch at one end of said elongated member open at an end and side of said elongated member receiving a fastener supporting the head with the shank projecting through the notch;

a retaining means carried forwardly of said notch engaging the head maintaining the head within the notch; and means moving said elongated member forwardly while said leaf spring so positions the fastener for reception by the fastener receiving means prior to rearward movement of the elongated member permitted by said notch open at an end releasing said shank portion formerly disposed therein.]

[6. The structure set forth in claim 5 including, a wheeled vehicle on which said device is carried including fastener feeding means for presenting fasteners for reception at said side of said notch.]

[7. The structure set forth in claim 6 wherein said means moving said elongated member includes fluid operated means, and cam means moved by said wheeled vehicle for actuating said fluid operated means.]

*8. A device for feeding fasteners having an enlarged impact receiving head and an elongated shank portion extending outwardly from an intermediate position thereof to a fastener receiving means comprising:*

*a housing;*

*an elongated member slidably carried by said housing;*

*means at one end of said elongated member open at an end and side of said elongated member receiving a fastener with the shank projecting therebelow;*

*a retaining means maintaining the fastener on the elongated member;*

*means moving said elongated member forwardly carrying the fastener for reception by the fastener receiving means prior to rearward movement of the elongated member permitted by means open at an end releasing said shank portion formerly disposed therein; and*

*a wheeled vehicle on which said device is carried including fastener feeding means for presenting fasteners for reception at said side of said means at one end of said elongated member.*

*9. The structure set forth in claim 8 wherein said means moving said elongated member includes fluid operated means, and cam means moved by said wheeled vehicle for actuating said fluid operated means.*

* * * * *